UNITED STATES PATENT OFFICE.

WILLIAM MORRISON, OF CHICAGO, ILLINOIS, ASSIGNOR, BY MESNE ASSIGNMENTS, TO EXMOOR STORAGE BATTERY COMPANY, OF CHICAGO, ILLINOIS, A CORPORATION OF ARIZONA TERRITORY.

STORAGE-BATTERY PLATE.

No. 842,801.  Specification of Letters Patent.  Patented Jan. 29, 1907.

Application filed January 20, 1905. Serial No. 242,010.

*To all whom it may concern:*

Be it known that I, WILLIAM MORRISON, a citizen of the United States of America, and a resident of Chicago, Cook county, Illinois, have invented a certain new and useful Improvement in Storage-Battery Plates and Processes of Making Same, of which the following is a specification.

In the manufacture of lead storage-battery plates more or less trouble has heretofore been experienced with the metal.

In molding the plate or grid the molten lead would not flow properly and would cool in such manner as to leave the plate or grid full of pores or minute openings. This, of course, resulted in an injurious attack of the electrolyte upon the plate or grid, the electrolyte entering the pores or minute openings and causing an injurious and weakening effect upon the plate or grid as a whole.

I am aware that some attempts have been made to overcome this difficulty and to make the molten metal flow properly and cool without leaving the plate or grid with pores or minute openings. So far, however, these attempts—such, for example, as the use of metallic sodium or metallic potassium—have failed to give satisfactory results. For instance, metallic sodium or metallic potassium when employed will improve the flow of the metal and will result in the production of a practically non-porous plate or grid. The trouble with this expedient, however, is obvious, for more or less of the sodium or potassium is liable to remain in the plate or grid and then be attacked and eaten out by the acid of the electrolyte, and in this way the plate or grid is very quickly rendered much more porous and inefficient than the plates or grids which are made in the ordinary way and without any attempt whatever to render them non-porous.

Generally stated, the object of my invention is, therefore, the provision of a lead battery-plate which is non-porous or practically non-porous and which is capable of remaining so while in use.

A special object of my invention is the provision of an improved process for making lead plates or grids for storage batteries and to provide a process involving the use of phosphorus or "phosphor-tin" or other equivalent substance for making the molten lead flow properly while the plate or grid is being molded, and for thus insuring a plate or grid which is non-porous or practically non-porous, and thereby of a character to more effectually resist the injurious and weakening attack of the electrolyte.

Other objects and advantages will hereinafter more fully appear.

In practicing my invention one method is as follows: First take an alloy of lead and antimony say one hundred pounds of lead to about twelve pounds of antimony—and then while the said alloy is in a molten condition add two ounces, more or less, of phosphorus. The result will be a metal which will flow properly while the plate or grid is being molded and which will cool and leave the plate or grid non-porous or practically non-porous and of a high degree of efficiency and serviceability. The phosphorus must be added in small portions first after the molten metal is stirred, and then the air-tight cover of the pot must be put on. This can be repeated until the desired amount of phosphorus has been added to the molten metal.

Another way is as follows: First take an alloy of lead, antimony, and tin—say one hundred pounds of lead, twelve pounds of antimony, and one and a half pounds of tin—and then while the alloy is in a molten condition, and in the manner stated, add about two ounces of phosphorus. This also will result in the production of a practically non-porous plate or grid.

Still another way, and one which I find gives good results, is as follows: First take one hundred pounds of lead to about twelve pounds of antimony, in the manner stated, and then add about one and a half pounds, more or less, of phosphor-tin, that is to say, tin containing phosphorus. Tin of this character is commonly known as "phosphor-tin" and is sold in the market as such. An alloy of these three metals in substantially the proportion given may be used in making the plates or grids for lead storage batteries. As in the other cases, a plate or grid made of such an alloy is practically non-porous. Lead thus made to contain phosphorus, or made by using phosphorus in suitable form or with other metal or metals may be termed "phosphor-lead," being a lead made with phosphorus.

In any event and regardless of the particular method employed the use of phosphorus in the manufacture of storage-battery plates or grids results in the production of a plate or grid which is practically non-porous and which will remain non-porous throughout its period of use in a storage battery.

What I claim as my invention is—

1. A storage-battery support or grid consisting of a phosphorous alloy containing lead and antimony.

2. A storage-battery support or grid consisting of an alloy containing lead, antimony, and "phosphor-tin."

3. A storage-battery support or grid consisting of a phosphorous alloy comprising lead, antimony and tin.

Signed by me at Chicago, Cook county, Illinois, this 9th day of January, 1905.

WILLIAM MORRISON.

Witnesses:
CLARENCE M. THORNE,
ALBERT SAUSER.